United States Patent Office 3,181,929
Patented May 4, 1965

3,181,929
METHOD OF INHIBITING CORROSION IN PURIFYING GASES
Joseph H. Field and Daniel Bienstock, both of Pittsburgh, Pa., assignors to the United States of America as represented by the Secretary of the Interior
No Drawing. Filed Dec. 1, 1961, Ser. No. 157,053
11 Claims. (Cl. 23—3)
(Granted under Title 35, U.S. Code (1952), sec. 266)

The invention herein described and claimed may be manufactured and used by or for the Government of the United States of America for governmental purposes without the payment of royalties thereon or therefor.

This invention is concerned with inhibiting the corrosive effect of aqueous potassium carbonate solutions on steel surfaces when used as a scrubbing agent for the removal of carbon dioxide and hydrogen sulfide from gas mixtures.

In recent years potassium carbonate solutions have been used extensively for the removal of carbon dioxide and hydrogen sulfide from industrial gas mixtures, such as from mixtures produced by the partial oxidation of gaseous, liquid, or solid fuels; from mixtures produced by the reforming of carbon monoxide with steam to produce hydrogen, or from naturally occurring gaseous hydrocarbons which are often found contaminated with large amounts of both $CO_2$ and $H_2S$. The use of potassium carbonate solutions for this purpose is described in detail for example in U.S. Patent 2,886,405 of Homer Benson and Joseph Field. In the scrubbing process, $CO_2$ and $H_2S$ are absorbed in the aqueous potassium carbonate solution and by reaction with the solution are converted respectively into potassium bicarbonate and potassium bisulfide. The solution circulates continuously between an absorption column where the $CO_2$ and $H_2S$ are absorbed and a regeneration column where they are desorbed by boiling and countercurrent steam stripping of the solution.

Since in industrial operations large volumes of gas are treated, the equipment required in the scrubbing operation is correspondingly large. The absorption and regeneration towers in a typical industrial installation may, for example, be sixty feet high and eight feet in diameter. For this reason, it is, of course, of considerable economic importance to use relatively low-cost materials such as mild carbon steel for the construction of the necessary equipment and to avoid as much as possible relatively expensive alloys such as stainless steel, inconel and the like.

It has been found, however, that ordinary mild steel as well as many steel alloys are subject to corrosive attack by aqueous potassium carbonate solutions as used in such operations. In an uninhibited solution, the corrosion rate is generally highest when the impurity to be removed consists of carbon dioxide alone. When the impurity to be removed consists of $H_2S$ alone, or mixtures of $H_2S$ with $CO_2$ which contain a fairly substantial proportion of $H_2S$, the corrosion rate is quite low and in many cases no corrosion inhibitor is required. This is generally the case when the molar ratio of $H_2S:CO_2$ is at least about 1:9. Apparently, such proportions of $H_2S$ effectively passivate the steel surfaces reducing the corrosion rate to acceptably low values without the use of an extraneous corrosion inhibitor. When the impurity consists mostly of $CO_2$, however, admixed with smaller proportions of $H_2S$, i.e., when the molar ratio of $H_2S:CO_2$ is less than about 1:9, the passivating effect of such small proportions of $H_2S$ is generally not sufficient to reduce the corrosion rate to tolerable levels.

In the first case mentioned, that is the removal of $CO_2$ alone, the corrosive effect of the solution on steel surfaces can be reduced to acceptable levels by the addition of various corrosion inhibitors such as small amounts of potassium dichromate or other dichromate salts. Under these conditions, the dichromate remains dissolved in the solution and retains its effectiveness over long periods. In the presence of $H_2S$, however, dichromate inhibitors and many other corrosion inhibitors such as nitrites are subject to the disadvantage that they tend to lose their corrosion inhibiting effect rapidly, often depositing an undesirable insoluble residue in the solution. Even trace amounts of $H_2S$, e.g., 10–100 parts per million, in the gas being treated are often sufficient to cause such previously employed inhibitors to be consumed at the uneconomically high rate.

There is, accordingly, a need for a corrosion inhibitor which retains its stability and effectiveness in protecting steel surfaces from the corrosive effect of aqueous potassium carbonate solutions containing both $H_2S$ and $CO_2$ absorbed therein. In particular, there is a need for such an inhibitor in the treatment of $CO_2$-$H_2S$ containing gas mixtures where the amount of $H_2S$ ranges from traces up to levels where the $H_2S:CO_2$ molar ratio is of the order of 1:9. In this range, as pointed out above, inhibitors previously employed cannot function effectively and the passivating effect of the $H_2S$ is insufficient to reduce the corrosion rate to tolerable levels. The problem is particularly acute where the $H_2S:CO_2$ ratio lies in the range of about 1:20 to 1:1000. Mixtures of this type frequently are encountered, for example, in the partial oxidation of carbonaceous fuels containing relatively small amounts of sulfur. Thus, for example, the gas mixture from the partial oxidation of a sulfur-bearing crude oil or from a sulfur-bearing coal may typically contain from 5 to 35 volume percent $CO_2$ and from .01 to 0.5 volume percent $H_2S$.

In accordance with the present invention, it has now been discovered that metavanadate salts which are at least slightly soluble in aqueous potassium carbonate solutions are not only highly effective in reducing the corrosive effect of such solutions on steel surfaces in the gas-treating operations described above, but that they also have the highly important advantage of retaining their solubility and anti-corrosion effectiveness in the presence both of $CO_2$ and $H_2S$. By virtue of their surprising ability to resist reduction and consequent precipitation by $H_2S$, the metavanadate salts afford a solution to the problems outlined above by providing effective corrosion protection in those critical areas where small amounts of $H_2S$ are found in admixture with substantial amounts of $CO_2$. In such circumstances where inhibitors previously employed would be rapidly consumed by reaction with the $H_2S$, the metavanadate salts retain their effectiveness and reduce the corrosion rate of steel surfaces to negligible values. The metavanadate salts have the additional advantage that they tend to increase somewhat the rate of $CO_2$ absorption in the absorber column, thus making possible some reduction in the size of the absorber.

While any metavanadate salt soluble at least to the extent of .05 percent by weight in aqueous potassium carbonate solutions is suitable, it is preferred to use the alkali metal metavanadates, particularly sodium metavanadate ($NaVO_3$) or potassium metavanadate ($KVO_3$), or ammonium metavanadate ($NH_4VO_3$). If desired, the metavanadate salt may be formed in situ, for example by adding vanadium pentoxide ($V_2O_5$) directly to the potassium carbonate solution upon which potassium metavanadate forms by reaction with potassium carbonate.

The metavanadate salts are effective in small amounts. Based on the total weight of solution, they can be used in concentrations as little as .01%. While increased effectiveness is generally not obtained in concentrations greater than about 2% by weight, amounts somewhat greater than this are generally not harmful. Preferred concentrations for maximum effectiveness and economy generally range from 0.05 to 0.5% by weight.

The metavanadate salts are highly effective in reducing the corrosion rate of steel surfaces in contact with the potassium carbonate solution to negligible values even in the case of highly concentrated solutions, e.g., 40% potassium carbonate by weight, operating at or close to their boiling point. Thus, in systems such as that described in U.S. Patent 2,886,405, when potassium carbonate solutions ranging from about 20% to 40% $K_2CO_3$ by weight are usually employed at maximum temperatures ranging from about 215° F. to 280° F., the metavanadate salts furnish a high degree of protection to steel equipment in contact with the solution, permitting mild carbon steel or relatively inexpensive steel alloys to be employed in most parts of the system. These salts also afford increased corrosion resistance for highly alloyed steels such as nickel-chrome stainless, but make their use unnecessary except in isolated portions of the system particularly subject to attack, e.g., pump impellers.

The following comparative tests illustrate the excellent corrosion protection afforded to steel surfaces in contact with a concentrated aqueous potassium carbonate solution in the presence of $CO_2$ alone and of $CO_2$-$H_2S$ mixtures. The tests were carried out by saturating 40% by weight aqueous potassium carbonate solution with $CO_2$ or a $CO_2$-$H_2S$ mixture by bubbling the gas through the solution while maintained at its atmospheric boiling temperature (228° F.). The $CO_2$-$H_2S$ mixture contained 99.7 volume percent $CO_2$ and 0.3 volume percent $H_2S$. Polished discs of mild carbon steel were immersed in the solution for the periods indicated in Table I below. In one series of tests, a small amount of sodium metavanadate was added in the concentration shown in Table I; and in the other series, no inhibitor was used. The corrosion rate was determined by weight loss after removal of corrosion products from the exposed portions of the discs. The results of the tests were as follows:

In a typical application of the process described in U.S. Patent 2,886,405, a 30% aqueous $K_2CO_3$ solution was employed to remove $CO_2$ and $H_2S$ from a gas mixture produced by the partial oxidation of a sulfur-containing Middle East crude oil followed by water-gas shift to convert carbon monoxide into additional hydrogen and having the following approximate analysis: 3% CO; 64% $H_2$; 32% $CO_2$; 0.5% $H_2S$; and about 0.5% $CH_4+N_2$. The absorption and regenerator towers and most of the piping were constructde of mild carbon steel. Maximum solution temperatures in the absorber and regenerator respectively were 245° F. and 235° F. By the addition of 0.2% by weight of $NaVO_3$ to the solution, the corrosion rate of the carbon steel surfaces was maintained at levels below 0.0005 inch per year. Only small additions of $NaVO_3$ necessary to restore normal solution losses were required to maintain the initial concentration of 0.2%. In contrast, the uninhibited corrosion rate of such a system is in excess of 0.01 inch per year, requiring frequent replacement of piping and other parts of the system. Potassium dichromate and various other corrosion inhibitors were ineffective, apparently due to rapid consumption by reaction with the $H_2S$ present in the raw gas.

We claim:

1. In the process for removing slightly acidic gases selected from the group consisting of carbon dioxide and hydrogen sulfide from gas mixtures with aqueous potassium carbonate solutions, the method of inhibiting the corrosion of steel surfaces in contact with said solution comprising the step of incorporating in said potassium carbonate solution a small amount of a metavanadate salt at least slightly soluble therein.

2. A method in accordance with claim 1 in which said metavanadate salt is incorporated in said solution in amounts ranging from 0.01% to 2% by weight based on said solution.

3. A method in accordance with claim 1 in which said metavanadate salt is incorporated in said solution in

*Table I*

| Ex. | System | Temp., ° F. | Concentration of inhibitor, wt. percent based on total solution | Length of test in days | Corrosion rate, in./year |
|---|---|---|---|---|---|
| 1 | 40% $K_2CO_3$ solution saturated with $CO_2$. | 228 | None | 14 | 0.34 |
| 2 | 40% $K_2CO_3$ solution with 99.7% $CO_2$+0.3% $H_2S$. | 228 | None | 30 | 0.01 |
| 3 | 40% $K_2CO_3$ solution saturated with $CO_2$. | 228 | 0.2% $NaVO_3$ | 30 | 0.00006 |
| 4 | 40% $K_2CO_3$ solution saturated with $CO_2$. | 228 | 0.1% $NaVO_3$ | 30 | 0.00004 |
| 5 | 40% $K_2CO_3$ solution saturated with 99.7% $CO_2$+0.3% $H_2S$. | 228 | 0.2% $NaVO_3$ | 30 | 0.00004 |
| 6 | 40% $K_2CO_3$ solution saturated with $CO_2$. | 228 | 0.2% $K_2Cr_2O_7$ | 30 | 0.00003 |
| 7 | 40% $K_2CO_3$ solution saturated with 99.7% $CO_2$+0.3% $H_2S$. | 228 | 0.2% $K_2Cr_2O_7$ | 31 | 0.01 |

As is apparent from the above, the metavanadate salt was extremely effective in reducing the corrosion rate in the presence both of pure $CO_2$ and $CO_2$-$H_2S$ mixtures. It will be noted that, although the small amount of $H_2S$ present in the uninhibited solution of Example 2 resulted in some reduction in the rate of corrosion (due to the slight passivating effect of the $H_2S$), the corrosion rate 0.01 inch per year is still excessive. The metavanadate salt in Example 5 afforded the necessary protection by decreasing the corrosion rate by a factor of 300 times. Although potassium dichromate was effective in Example 6 in the presence of pure $CO_2$, in Example 7 in the presence of $H_2S$ the dichromate rapidly formed a dark precipitate and completely lost its anti-corrosion effectiveness, the corrosion rate being the same as in the uninhibited solution of Example 2.

amounts ranging from 0.05% to 0.5% by weight based on said solution.

4. In the process for removing slightly acidic gases selected from the group consisting of carbon dioxide and hydrogen sulfide from gas mixtures with aqueous potassium carbonate solutions, the method of inhibiting corrosion of steel surfaces in contact with said solution comprising the step of incorporating in said potassium carbonate solution a small amount of a metavanadate salt selected from the group consisting of the alkali metal and ammonium metavanadates.

5. A method in accordance with claim 4 in which the said metavanadate salt is incorporated in said solution in an amount ranging from 0.05% to 0.5% by weight based on said solution.

6. In the process for removing slightly acidic gases selected from the group consisting of carbon dioxide and hydrogen sulfide from gas mixtures with aqueous potassium carbonate solutions, the method of inhibiting the corrosion of steel surfaces in contact with said solution comprising the step of incorporating in said potassium carbonate solution from 0.01% to 0.5% by weight based on the weight of said solution, of a metavanadate salt selected from the group consisting of alkali metal and ammonium metavanadates.

7. A method in accordance with claim 6 in which said metavanadate is potassium metavanadate which is formed in said solution in situ by the addition of vanadium pentoxide to said solution.

8. In the process for treating a gas mixture containing $CO_2$ and $H_2S$ in a ratio of $H_2S:CO_2$ of less than about 1:9 with aqueous potassium carbonate solution to remove said $CO_2$ and $H_2S$, the method of inhibiting the corrosion of steel surfaces in contact with said solution comprising the step of incorporating in said potassium carbonate solution a small amount of a metavanadate salt at least slightly soluble therein.

9. A method in accordance with claim 8 in which said metavanadate salt is incorporated in amounts ranging from 0.01% to 2% by weight based on said solution.

10. In the process for treating a gas mixture containing $CO_2$ and $H_2S$ in a ratio of $H_2S:CO_2$ in the range of about 1:20 to 1:1000 with aqueous potassium carbonate solutions to remove said $CO_2$ and $H_2S$, the method of inhibiting the corrosion of steel surfaces in contact with said solution comprising the step of incorporating in said potassium carbonate solution a small amount ranging from about 0.05% to 0.5% by weight based on said solution of a metavanadate salt selected from the group consisting of the alkali metal and ammonium metavanadates.

11. A method in accordance with claim 10 in which said metavanadate is potassium metavanadate which is formed in said solution in situ by the addition thereto of vanadium pentoxide.

References Cited by the Examiner
UNITED STATES PATENTS

| | | | |
|---|---|---|---|
| 2,031,632 | 2/36 | Bottoms | 23—2.3 |
| 2,785,045 | 3/57 | Shen Wu Wan et al. | 23—3 X |
| 2,886,405 | 5/59 | Benson et al. | 23—3 |
| 3,087,778 | 4/63 | Negra et al. | 23—3 |
| 3,144,301 | 8/64 | Mayland | 23—2 |

MAURICE A. BRINDISI, *Primary Examiner.*